(No Model.)
E. Z. COLLINGS & C. F. PIKE.
SEWER INLET.
No. 275,802. Patented Apr. 17, 1883.
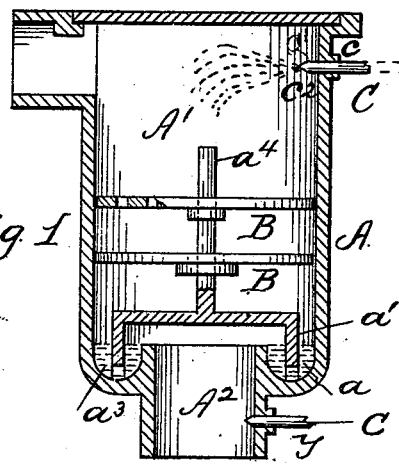
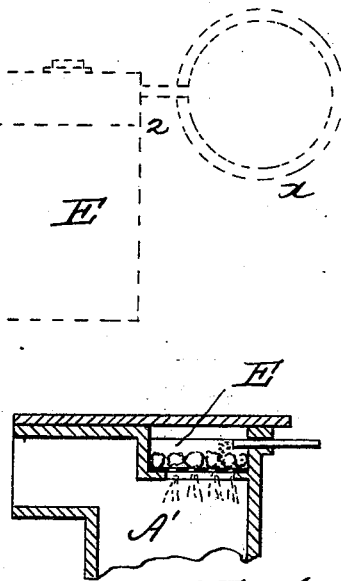
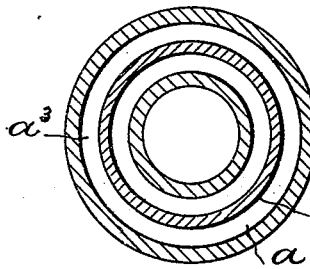
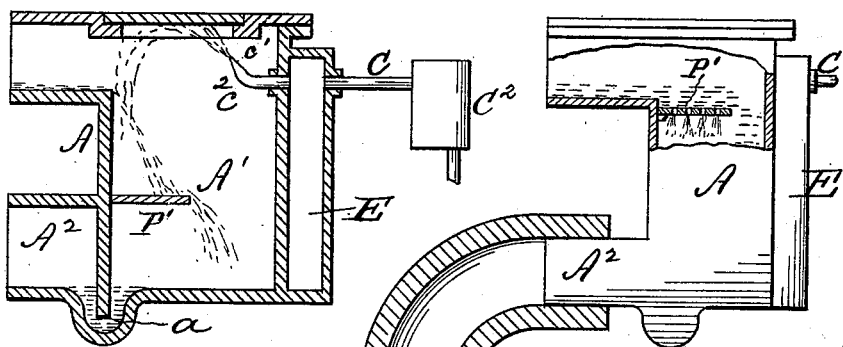
Witnesses:
Chas F Hawthorn
Edwin Paramore
Inventors:
Edward Z. Collings
Charles F. Pike
By S. J. Van Stavoren
Attorney

UNITED STATES PATENT OFFICE.

EDWARD Z. COLLINGS, OF CAMDEN, NEW JERSEY, AND CHARLES F. PIKE, OF PHILADELPHIA, PENNSYLVANIA.

SEWER-INLET.

SPECIFICATION forming part of Letters Patent No. 275,802, dated April 17, 1883.

Application filed August 10, 1882. (No model.)

*To all whom it may concern:*

Be it known that we, EDWARD Z. COLLINGS, of Camden, in the county of Camden and State of New Jersey, and CHARLES F. PIKE, of Philadelphia, in the county of Philadelphia and State of Pennsylvania, citizens of the United States, have invented certain new and useful Improvements in Sewer-Inlets, of which the following is a specification, reference being had therein to the accompanying drawings, wherein—

Figure 1 is a vertical section of a sewer-inlet embodying our improvements. Fig. 2 is a horizontal section through the trap of the same. Fig. 3 is a detail section of a modification. Fig. 4 is a section of a modified form of sewer-inlets provided with our invention; and Fig. 5 is an elevation, partly sectional, of same connected to the sewer, the latter being in section.

Our invention has relation to sewers and their inlets, and has for its object to disinfect such devices and prevent the escape of sewer-gas therefrom.

It is well known that water and other fluids will absorb a certain amount or volume of sewer-gas, and the more intimately the gas and fluid are commingled together the greater the absorption. It is also well known that when a body of water or other fluid is divided into small particles or atoms, or when it is sprayed, it presents a larger surface for such absorption and takes up proportionately a greater volume of such gas than it does when in a fluid condition. Such being the case, it follows that if a spray of water or other fluid be continuously injected into a sewer or its inlet the gas or odors therein will be absorbed by such fluid and carried off thereby. Hence such gases cannot escape from the inlet to pollute the surrounding atmosphere. Again, if such water or fluid be commingled with or caused to pass through a disinfectant to take up the same, and then injected into the sewer or its inlet in a sprayed or finely-divided condition, it not only absorbs the gases or odors therein, but disinfects said parts and keeps them in a clean and wholesome condition.

Our invention accordingly consists of the novel combination, construction, and arrangement of parts for accomplishing the above-described results, as hereinafter specifically described and claimed.

Referring to the accompanying drawings, A represents a sewer-inlet having a trap, $a$, of the form shown in Figs. 1 and 4, or of any other suitable construction.

The trap $a$ in Fig. 1 consists of an inverted cup, the flange $a'$ of which enters the sealing-groove $a^3$, and is provided with a stem or rod, $a^4$, upon which is secured one or more screens or gratings, B B, to prevent coarse dirt and garbage or other materials entering trap $a$ to choke up the same.

C represents a pipe connected at $c$ to inlet A, its end $c'$ terminating in a nozzle, sprayer, or atomizer, $c^2$, as shown. Said pipe is designed to be connected to the water-main $x$, a branch thereof, or a reservoir, so that a continuous running stream of water may pass therethrough to the nozzle $c^2$ and be injected into chamber A' of inlet A in the form of a spray, or otherwise finely divided or atomized. Each atom or fine stream of water as it passes through chamber A' presents a surface for contacting with and absorbing any gases or odors that find their way or are generated therein, and are carried off by such water through trap $a$ to sewer D, as shown in Fig. 5. The pipe C may be connected to the inlet A, as shown at $c$, Fig. 1; or the exit pipe or conduit A² thereof may be furnished with such a pipe, as represented at $y$, Fig. 1, and the sewer D may have one or more of said pipes connected thereto at every mile or less of its length, so that a series of continuously-flowing streams of water will be sprayed into such devices to absorb all sewer gas and odors generated therein.

In the line of the pipes C a tank or reservoir, E, is located, in which is placed a fluid or solid disinfectant. Such reservoir is represented at E in Fig. 1, the line 2 2 indicating the height of the disinfectant therein. As the water passes therethrough it is charged with the disinfectant, and, when sprayed into the inlet or sewer, disinfects said parts in a very thorough manner.

If desired, the inlet A may have a disinfectant-containing pocket or chamber formed therein, as shown at E, Fig. 3, the disinfectant being placed upon a screen or grating in said pocket, which serves to divide the water into fine streams or particles as it passes therethrough into chamber A'; or said pocket may be constructed and the pipe C, with its nozzle $c^2$, arranged as shown in Fig. 4. The sprayed water or disinfectant-water falling into trap $a$ provides a running-seal therefor for obtaining the beneficial results of the use of said seal, as fully described in an application filed by us of even date herewith. The pipe C may have a valve, or its bore may be sized, as desired, for regulating the flow of water therethrough, as fully set forth in said application; or a filter, $C^2$, may be secured thereto, as shown in Fig. 4.

If desired, a screen, P', or a plate, P', may be secured to the inlet A in chamber A', so that water flowing through the mouth of the inlet will pass through said screen or fall on said plate and be sprayed or divided into small streams to absorb the sewer-gas in the inlet. Such screen is shown in Fig. 5, and the plate P' is illustrated in Fig. 4.

What we claim as our invention is—

1. The combination of inlet A, trap $a$, and pipe C, terminating in a spraying device, $c^2$, and leading to a constant source of water-supply, $x$, substantially as shown and described.

2. The combination of inlet A, having trap $a$, the pipe C, the spraying device $c^2$, and reservoir E, substantially as and for the purpose set forth.

3. The inlet A, having groove $a^3$, inverted flanged cup or valve $a'$, having stem $a^4$, and screens or gratings B B, substantially as shown and described.

In testimony whereof we affix our signatures in presence of witnesses.

EDWARD Z. COLLINGS.
CHARLES F. PIKE.

Witnesses:
S. J. VAN STAVOREN,
CHAS. F. VAN HORN.